(12) United States Patent
Giovannone et al.

(10) Patent No.: US 12,517,547 B2
(45) Date of Patent: Jan. 6, 2026

(54) SYSTEM AND METHOD FOR GENERATING A PLURALITY OF CONTROL SIGNALS IN MULTI-DIE SYSTEMS

(71) Applicant: STMicroelectronics S.r.l., Agrate Brianza (IT)

(72) Inventors: Juri Giovannone, Cernobbio (IT); Roberto Giorgio Bardelli, Fino Mornasco (IT); Andrea Gambero, Santo Stefano Ticino (IT); Alessio Corso, Paderno Dugnano (IT); Donata Rosaria Maria Nicolosi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 119 days.

(21) Appl. No.: 18/631,738

(22) Filed: Apr. 10, 2024

(65) Prior Publication Data

US 2024/0361800 A1 Oct. 31, 2024

(30) Foreign Application Priority Data

Apr. 27, 2023 (IT) .................. 102023000008265

(51) Int. Cl.
  *G06F 1/10* (2006.01)
  *G04F 10/00* (2006.01)
  *G06F 1/12* (2006.01)
  *H03K 5/00* (2006.01)

(52) U.S. Cl.
  CPC .............. *G06F 1/10* (2013.01); *G04F 10/005* (2013.01); *G06F 1/12* (2013.01); *H03K 5/00* (2013.01); *H03K 2005/00013* (2013.01)

(58) Field of Classification Search
  None
  See application file for complete search history.

(56) References Cited

U.S. PATENT DOCUMENTS

| | | | |
|---|---|---|---|
| 8,183,904 B2 | 5/2012 | Giovannone et al. | |
| 8,902,094 B1* | 12/2014 | Zhang | H03L 7/0814 341/122 |
| 9,479,150 B1 | 10/2016 | Lin | |
| 2019/0273439 A1 | 9/2019 | Desai et al. | |
| 2022/0302918 A1 | 9/2022 | Srivastava et al. | |

OTHER PUBLICATIONS

Foley, Raymond F., et al., "A Versatile Digital Pulsewidth Modulation Architecture with Area-Efficient FPGA Implementation," 2005 IEEE 36th Power Electronics Specialists Conference; Dresden, Germany; Jun. 16, 2005; 7 pages.

* cited by examiner

*Primary Examiner* — Cassandra F Cox
(74) *Attorney, Agent, or Firm* — Slater Matsil LLP

(57) ABSTRACT

The present invention relates to a system and a method for generating a plurality of control signals for multi-die applications. In particular, the invention relates to the generation of synchronized control signals generated by independent dies having an own local clock and provided with a common clock. In a first step, in each die, the period of the common clock signal is measured using a TDC. In further steps, in each die, a respective phase shift is evaluated and applied between the rising edge of the common clock signal and each of the rising edges of the output control signals, using delay unit.

20 Claims, 11 Drawing Sheets

SYSTEM AND METHOD FOR GENERATING A PLURALITY OF CONTROL SIGNALS IN MULTI-DIE SYSTEMS

CROSS-REFERENCE TO RELATED APPLICATIONS

This application claims the benefit of Italian Application No. 102023000008265, filed on Apr. 27, 2023, which application is hereby incorporated herein by reference.

TECHNICAL FIELD

The present disclosure relates to a system and a method for generating a plurality of control signals. In particular, the invention relates to generating synchronized control signals generated by independent dies having their own local clock and being provided with a common clock.

BACKGROUND

The increasing variety of applications of smart power integrated circuits in many fields, ranging from telecommunications to automotive, requires further integration and a high-efficiency power conversion circuit. Further to the above, flexibility is also an important requirement, so several multi-die systems have been proposed. For example, car OEMs adopting a 48V rail can utilize a centralized or distributed approach to power distribution. A flexible and reconfigurable power conversion product has the possibility to be used in both architectures and for this reason, the implementation of a multiphase multi-die DC/DC converter with a digital control loop is more and more common.

In general, for a multi-die system (e.g., multiphase DC/DC converters), the chip-level digital signal synchronization that aims to establish a global clock signal across multiple functional dies is harder to achieve than its single-die counterpart.

The GALS technique ("Globally Asynchronous Locally Synchronous") performs poorly because a high skew value cannot be achieved. The delay matching technique, using delay-line-based skew compensators, is an alternative with high performance to skew reduction on a single die but is not suited for use in multi-die and multiphase systems because it is difficult to align clock edges at clock distribution ends of multiple clock domains on different dice (consumption is very high and in particular cases, actual implementation is not practicable).

To better understand the problem of the known art, a multi-die multi-phase DC/DC converter is taken as an example. Reference is made to FIG. 1. We can assume that a central processing unit (CPU) provides N different dies with a common low-frequency signal that will be the switching clock of the multi-die multi-phase DC/DC converter. Each die manages a dedicated system phase and provides an associated PWM (Pulse Width Modulation) signal. The width of this signal is locally determined by a dedicated digital loop implemented in each die because each phase must address different non-idealities. To increase the performance of the control loop, the system clock of the digital circuits is much higher than the switching clock frequency of the DC/DC converter, and it is locally generated by a dedicated oscillator. For this reason, each die must have a local high-frequency oscillator; due to the intrinsic non-ideality and the PVT variations, it is impossible to have each die the same clock as the one in the other dies.

There is, therefore, the need to overcome the above-mentioned issues.

SUMMARY

The present invention relates to a system and a method for generating a plurality of control signals, as defined in the annexed claims.

This invention method has the benefit that the clock network of each die can be designed independently. In contrast, the clock skew of the entire chip can still be minimized at run-time in response to its operating environment.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION OF ILLUSTRATIVE EMBODIMENTS

Figure 2:
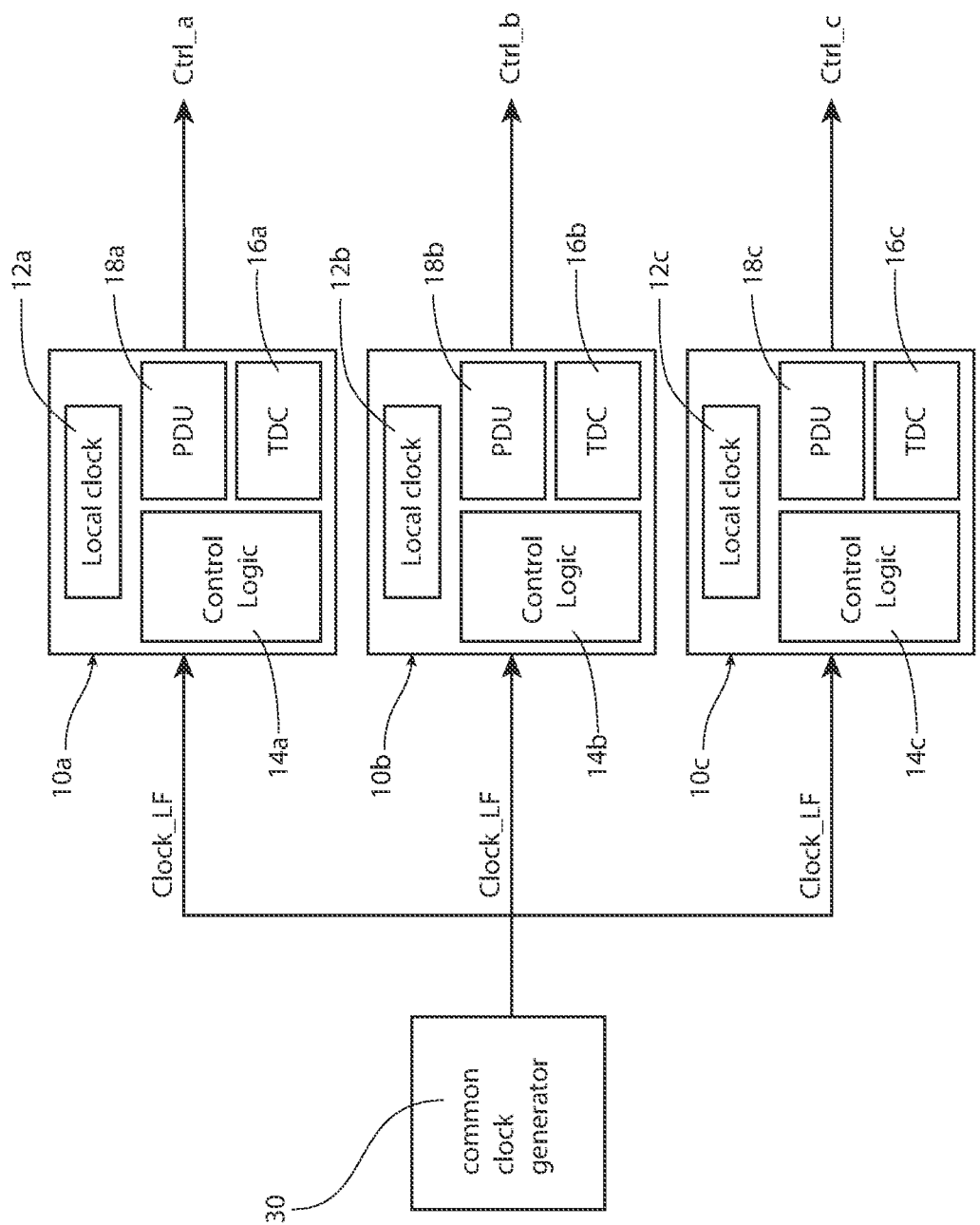
FIG. 2 is a schematic representation of a multi-die system according to an embodiment of the invention.

FIG. 2 schematically illustrates a plurality of dies (or chips) 10a-10c (generally, the dies can be more than three, as the figure represents). Each die 10a-11c has its own local clock oscillator 12a-12c, providing a local clock signal Clock_a, Clock_b, Clock_c. Each die 10a-11c receives at input, from a common clock oscillator 30, a common clock signal Clock_LF at low frequency, namely a frequency lower than the frequency of each local clock signal Clock_a-Clock_d. For example, the frequency of Clock_LF is one order of magnitude lower than the frequency of the local clock signals Clock_a-Clock_d. As an example, Clock_LF has a frequency in the range 100 KHz-1 MHz, corresponding to a period in the range 1-10 ps.

Local clock signals Clock_a-Clock_c are not necessarily synchronous to one another. Instead, in a practical implementation, each local clock signals Clock_a-Clock_c has an own frequency and phase unrelated to the other frequencies and phases. Each die 10a-11c is unaware of the frequency and phase of the local clock signals Clock_a-Clock_c of the other dies 10a-11c. For example, the frequency of the local clock signals Clock_a-Clock_c is in the range 40-50 MHz, corresponding to a period in the range 20-25 ns.

Each die 10a-11c further comprises an own control logic 14a-14c, an own time-to-digital converter (TDC) 16a-16c, and an own delay unit (DU) 18a-18c, in particular a programmable delay unit (PDU).

The TDCs 16a-16c and the PDUs are known in the art; exemplary embodiments of a TDC and of a PDU are described in U.S. Pat. No. 8,183,904.

Each die 10a-11c generates its own control signal Ctrl_a-Ctrl_c. In several applications, like automotive applications, using a multiphase approach to DC-DC converter design allows developers to increase the maximum current capacity, reduce size and output ripple, and improve transient response. For example, a multiphase DC-DC converter 1, with buck topology, uses a parallel set of buck regulators Ra-Rc, as shown in FIG. 3.

Figure 3:
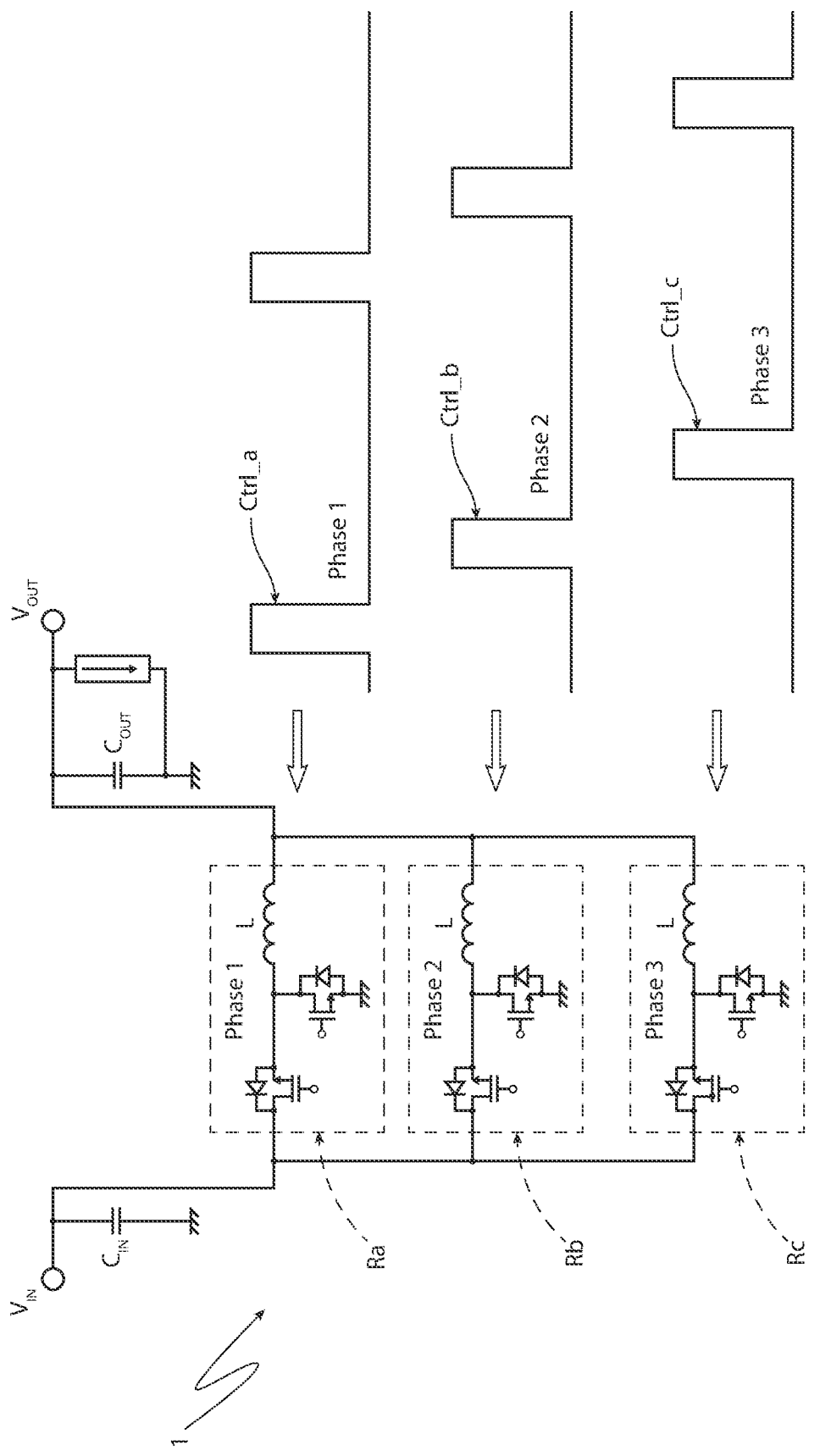
FIG. 3 is a schematic representation of a possible practical application of the system of an embodiment of the invention.

FIG. 3 shows a functional diagram of a three-phase buck converter 1. The electrical elements forming converter 1 are known in the art and not described in detail. Each of the three regulators Ra-Rc has a common input $V_{IN}$ and output $V_{OUT}$. Each regulator Ra-Rc runs at a controlled duty cycle, but they are phased to be active at spaced intervals so that only one phase is active at any given time. Therefore, each phase (here, Phase1, Phase 2, Phase 3) switches independently to contribute power at its prescribed portion of the cycle.

In some applications, the phase signals are provided by different dies. In the context of the present disclosure, die 10a provides the control signal Ctrl_a to active phase 1, die 10b provides the control signal Ctrl_b to activate phase 2, and die 1c provides the control signal Ctrl_c to activate phase 3. Since, as said, the control signals are not necessarily synchronized to one another, the aim of the present invention is to synchronize the control signals Ctrl_a-Ctrl_c with the common clock signal Clock_LF, to be able to drive the three-phase buck converter 1 as prescribed.

The teaching of the present invention should not be limited to driving a multi-phase converter, as this is a mere example useful to contextualize the invention. Other applications may be apparent to those skilled in the art.

Figure 4:
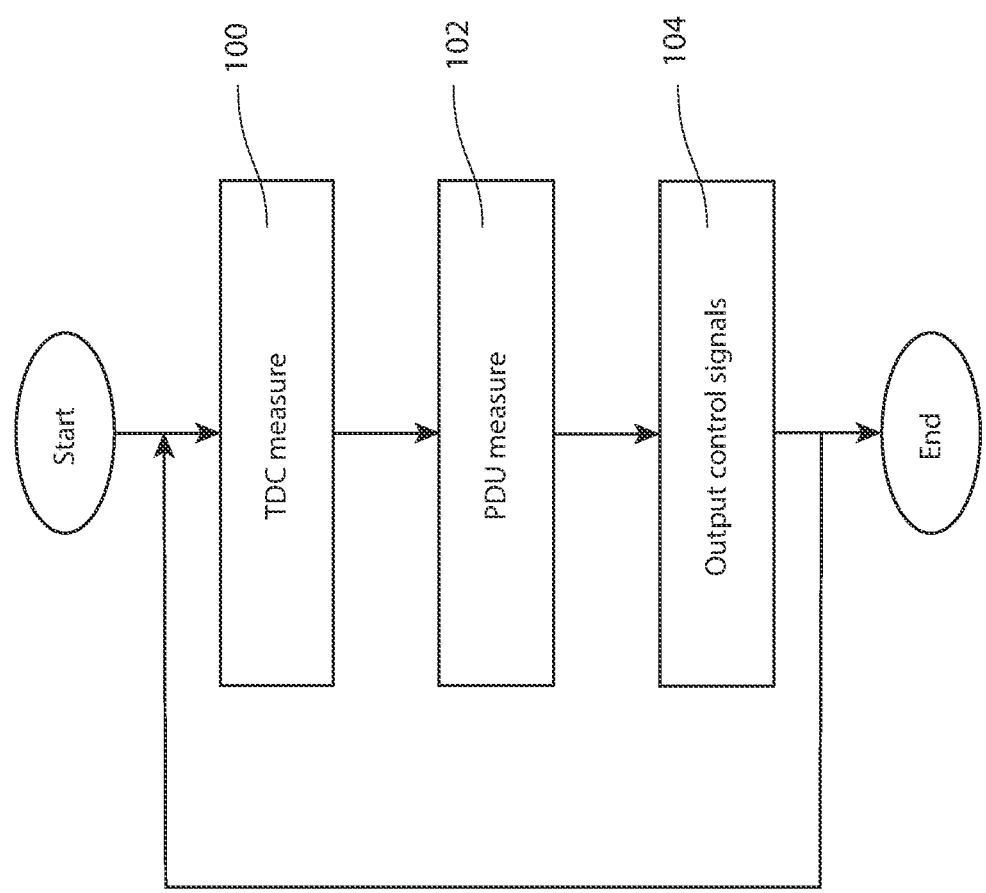
FIG. 4 is a flow chart of a method according to an embodiment of the invention.

In brief, the present invention foresees the following steps, as outlined in FIG. 4:

Step 100: in each die 10a-10c, measuring the period of the common clock signal Clock_LF using the TDCs 16a-16c (in each die 10a-10c, the time resolution of the respective TDC must be lower than the period of the respective local clock signal); and Steps 102, 104: in each die 10a-10c, calculate and apply a respective phase shift between the rising edge of the common clock signal Clock_LF and each of the rising edges of the output control signals Ctrl_a-Ctrl_c, using the respective PDU (wherein the control signals Ctrl_a-Ctrl_c are generated in each die 10a-10c based on the local clock signals Clock_a-Clock_c).

Figure 5:
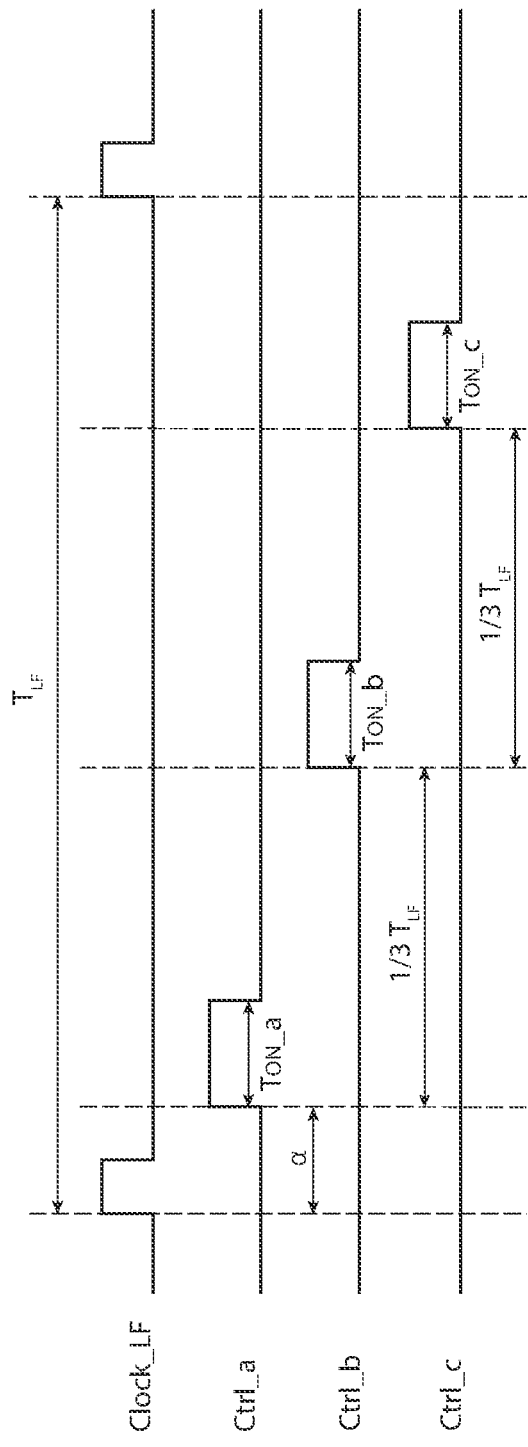
FIG. 5 shows control signals generated according to an embodiment of the invention, compared to a common clock signal.

FIG. 5 shows the output control signals Ctrl_a-Ctrl_c that must be generated, wherein each output control signal Ctrl_a-Ctrl_c toggles between a low value ("0") and a high value ("1"). Each output control signal Ctrl_a-Ctrl_c has, during each period $T_{LF}$ of the common clock signal Clock_LF, one rising edge from "0" to "1" and one falling edge from "1" to "0"; each output control signal Ctrl_a-Ctrl_c is at the "1" value for a respective time duration $T_{ON\_a}$-$T_{ON\_c}$. In one embodiment, time durations $T_{ON\_a}$-$T_{ON\_c}$ are equal. In another embodiment, time durations $T_{ON\_a}$-$T_{ON\_c}$ are different (i.e., $T_{ON\_a}*T_{ON\_b}*T_{ON\_c}$). In another embodiment, some time durations $T_{ON\_a}$-$T_{ON\_c}$ may coincide, while other time durations $T_{ON\_a}$-$T_{ON\_c}$ may differ.

Figure 1:
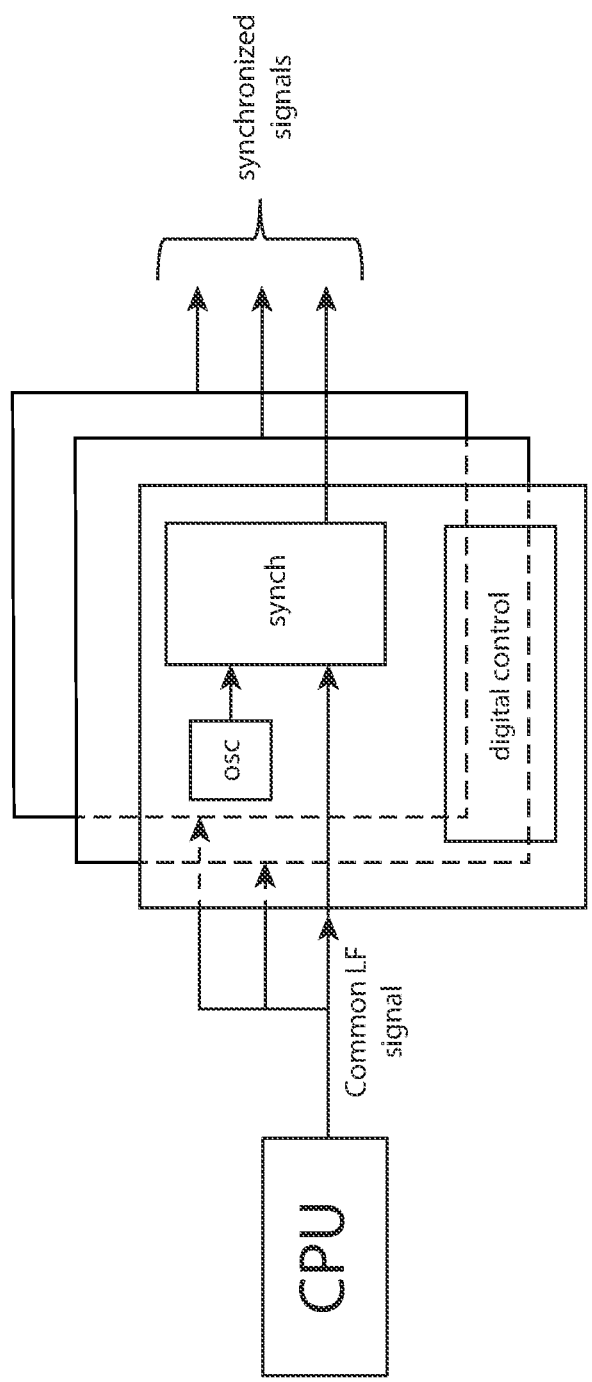
FIG. 1 is a schematic representation of a system according to the known art.

In one exemplary embodiment, time durations $T_{ON\_a}$-$T_{ON\_c}$ are in the range 100 ns-200 ns. The values of time durations $T_{ON\_a}$-$T_{ON\_c}$ are set by an external CPU or logic that generates the Clock_LF signal (see for example the CPU of FIG. 1) or by an external controller of the multiphase DC-DC converter, and are input to each die 10a-10c, or stored in a local memory (not shown) of each die 10a-10c.

As represented in FIG. 5, the rising edge of one output control signal among signals Ctrl_a-Ctrl_c is spaced from the rising edge of another output control signal Ctrl_a-Ctrl_c by a time value $(1/n)\cdot T_{LF}$, where n is the number of dies 10a-10c (in this example n=3) and $T_{LF}$ is the period of the common clock signal Clock_LF. In other words, the rising and falling edges of $T_{ON\_a}$-$T_{ON\_c}$ are not coincident with one another, but delayed from one another by the amount $(1/n)\cdot T_{LF}$. In the example shown, the first output control signal generating the high ("1") value is Ctrl_a, then after $(\frac{1}{3})\cdot T_{LF}$ from the rising edge of Ctrl_a also output control signal Ctrl_b goes high ("1"), then after $(\frac{1}{3})\cdot T_{LF}$ from the rising edge of Ctrl_b also output control signal Ctrl_c goes high ("1"). A delay α, from the rising edge of the common clock signal Clock_LF, can be present before generating the rising edge of the first output control signal, here Ctrl_a; the value of delay α is fixed or otherwise determined in the previous $T_{LF}$ period in such a way that the control logic has a margin to conclude all the required computations even after the beginning of the new period $T_{LF}$. For example, a is a fraction of $T_{LF}$, such as ¹⁄₁₀ of $T_{LF}$.

Figure 6:
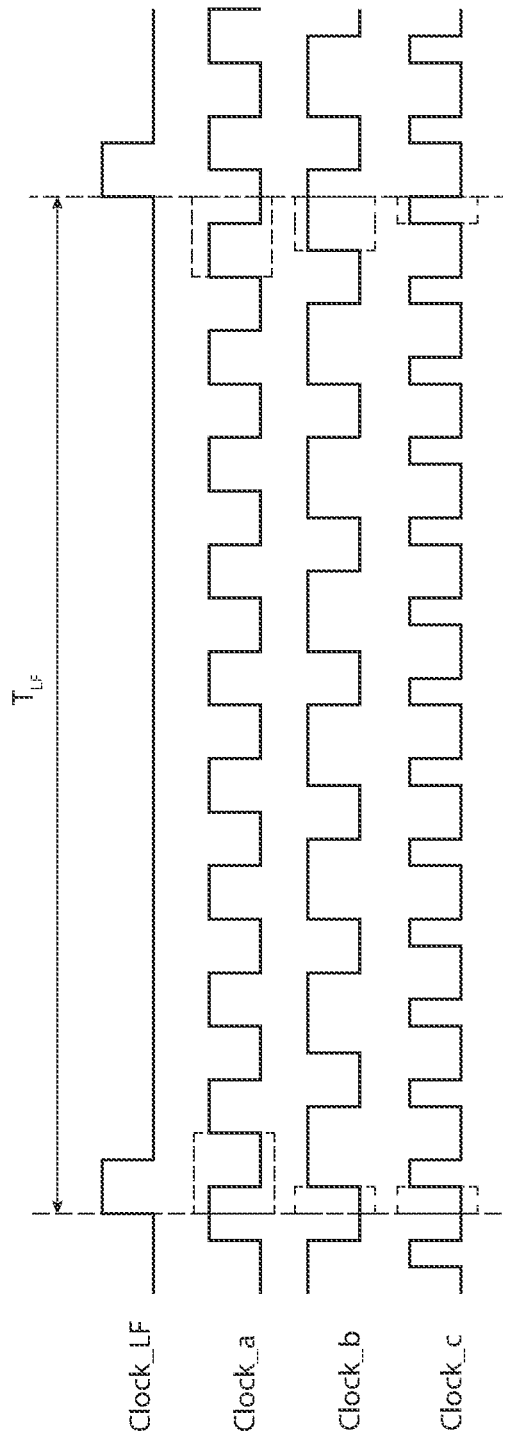
FIG. 6 shows local clock signals generated in a respective plurality of dies of the multi-die system of an embodiment of the invention, compared to the common clock signal.

FIG. 6 shows exemplary local clock signals Clock_a-Clock_c and a common clock Clock_LF. Since high precision is required for the correct (timely) generation of control signals Ctrl_a-Ctrl_c, it is not enough to measure the number or full (complete) periods of each local clock signals Clock_a-Clock_c within the considered period $T_{LF}$ of the common clock Clock_LF. The incomplete clock periods at the beginning and at the end of each local clock signals Clock_a-Clock_c, within the considered period $T_{LF}$ of the common clock Clock_LF, are to be measured as well (see the selected regions in dotted line of FIG. 6).

For example, in FIG. 6, Clock_a has 8 full periods and two fractional periods (one at the beginning, the other one at the end). Analogously, Clock_b has 7 full periods and two fractional periods (one at the beginning, the other one at the end); analogously, Clock_c has 12 full periods and two fractional periods (one at the beginning, the other one at the end). In all three local clock signals, the fractional periods cannot be correctly counted.

In each die 10a-10c, the respective TDC 16a-16c provides at output a digital signal (or digital code) that corresponds to the local clock period of the local clock signal generated by the respective oscillator 12a-12c (belonging to the same die 10a-10c housing the corresponding TDC 16a-16c), with a higher resolution than the corresponding local clock signal Clock_a-Clock_c. For example, the time resolution of each TDC 16a-16c is in the range of hundreds of picoseconds, such as 100-150 ps.

Figure 7:
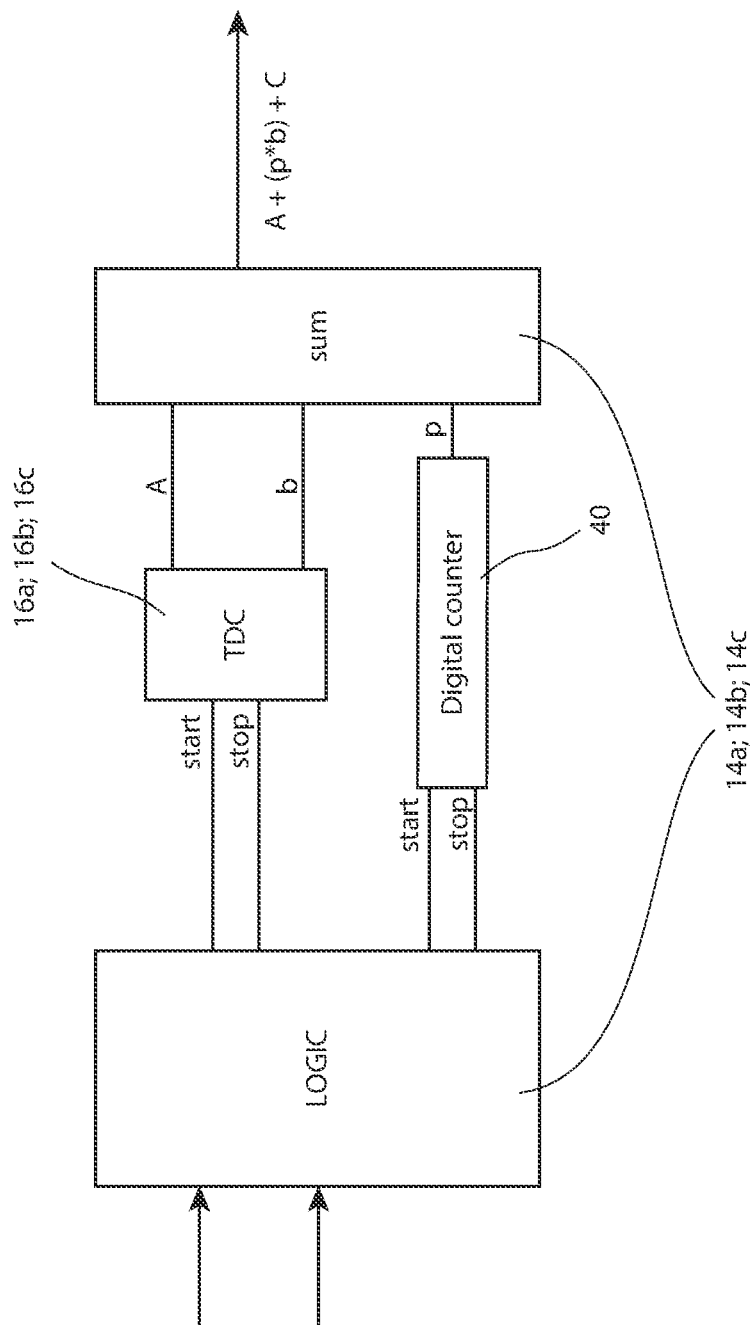
FIG. 7 is a schematic representation of operative blocks belonging to each die of the multi-die system of an embodiment of the invention.
Figure 8:
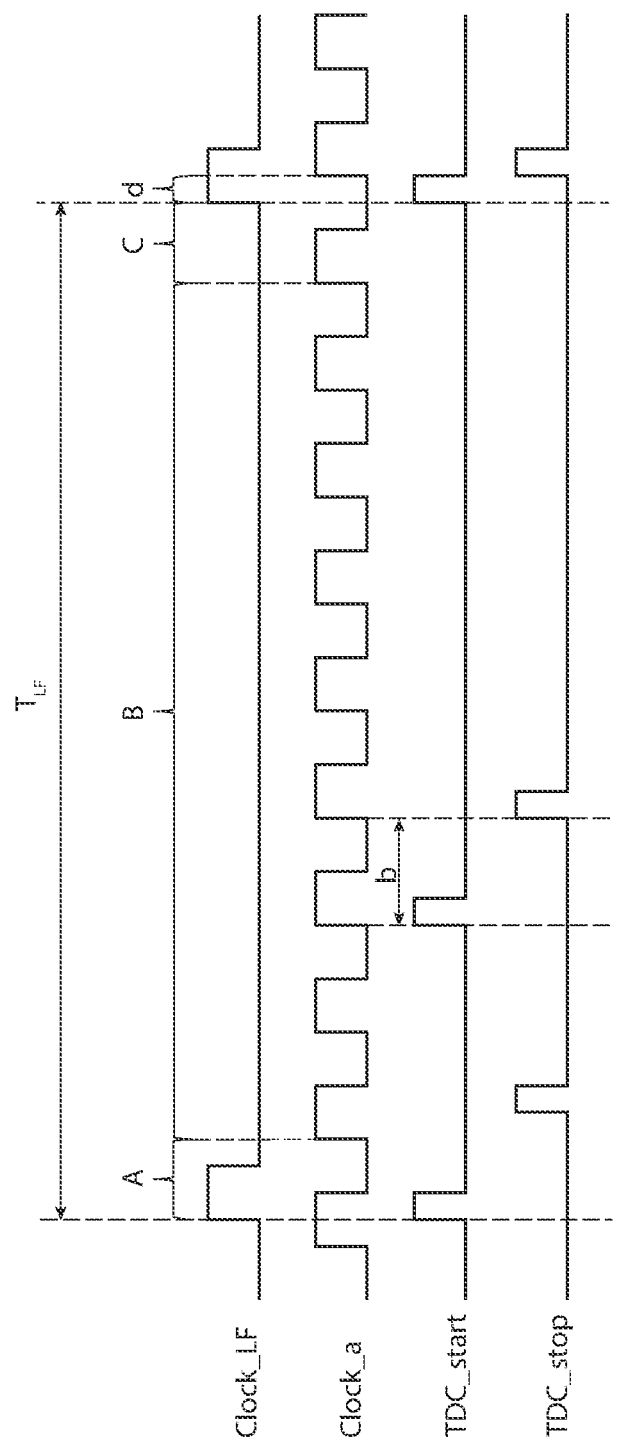
FIG. 8 shows operative signals of a time-to-digital converter, used to convert in digital units a local clock signal during a full period of the common clock signal, according to an embodiment of the invention.

Step 100 of FIG. 4 is implemented schematically in FIG. 7. Reference is also made to FIG. 8, where the local clock signal Clock_a is an example. The same applies to the other local clock signals Clock_b and Clock_c. Other elements of the die 10a are mentioned and the disclosure applies analogously to the corresponding elements of the other dies 10b, 10c.

The TDC 16a is configured to measure one full (complete) clock period of the local clock signal Clock_a, and to generate a result (identified as "b" in FIGS. 7 and 8) in digital units of the TDC 16a (the term "digital units" is here used to identify the measuring unit of the digital output of the TDC). The measure of such full local clock period can be achieved by starting the operation of the TDC 16a (signal TDC_start at "1") at one rising edge of the local clock signal Clock_a and by ending the operation of the TDC 16a (signal TDC_stop at "1") at the subsequent rising edge of the local clock signal Clock_a (always within the period $T_{LF}$ considered). The period used for measuring "b" can be freely chosen, provided that the TDC is ready for measuring "b" after having executed previous measurements (for example, after having measured "A"). Instead of considering one single period, the value of "b" can also be measured based on the mean value of more than one period.

Then, the control logic 14a multiplies the output "b" of the TDC 16a by the number "p" of full clock periods (in the example of Clock_a, 8 full clock periods, i.e., B=8·b). The time length of the sum of all the full clock periods of the local clock signal Clock_a (within the period $T_{LF}$ considered) is thus obtained in TDC's digital units, here represented as "B."

To measure, with the TDC 16a, the first fraction of period (i.e., the left-had fraction in the local clock signal of FIG. 8), here represented as "A," the TDC 16a is controlled (by the control logic 14a-14c) to start its operation (signal TDC_start at "1") at the rising edge of the common clock signal Clock_LF and to end its operation (signal TDC_stop at "1") at the first rising edge of the local clock signal Clock_a. The value of "A" is in TDC's digital units, analogously to the values of "b" and "B."

To measure, with the TDC 16a, the second (last) fraction of period (i.e., the right-had fraction in the local clock signal of FIG. 8), here represented as "C," the TDC 16a is controlled (by the control logic 14a-14c) to start its operation (signal TDC_start at "1") at the next rising edge of the common clock signal Clock_LF (i.e., the rising edge that determines the end of the current clock period $T_{LF}$) and to end its operation (signal TDC_stop at "1") at the first rising edge of the local clock signal Clock_a after the above-mentioned rising edge of the common clock signal Clock_LF. The value "d" is thus obtained in TDC's digital units. The required value C is obtained by the control logic 14a as C=b−d. The value of "C" is in TDC's digital units, analogously to the values of "A" and "B."

Therefore, time duration $T_{LF\_a}$ of the common clock signal Clock_LF, measured in die 10a by TDC 16a and represented in TDC's digital units, is calculated by the control logic 14a-14c as $T_{LF\_a}$=A+B+C, wherein, summarizing:

A represents the first fractional period of the local clock signal, expressed in TDC units;

b represents one local clock period of the local clock signal Clock_a after conversion of the local clock period in TDC units;

B represents the duration of all the full local clock periods of the local clock signal Clock_a in one period $T_{LF}$ of the common clock signal Clock_LF, as computed by the control logic 14a and expressed in TDC units, or B=(full periods of Clock_a)·b.

d represents one fractional portion of the last, non-complete, local clock period that began within the common clock period $T_{LF}$, but ended after the end of $T_{LF}$; more particularly, d is the fractional portion after the end of the common clock period $T_{LF}$;

C=b−d represents the fractional portion of the last, non-complete, local clock period within the common clock period $T_{LF}$, computed by the control logic 14a and expressed in TDC units.

As already said, the same discussion and disclosure provided above apply evidently to the conversion in TDC units of the other local clock signals Clock_b and Clock_c.

FIG. 7 also shows a digital counter block 40. The counter block 40 is used to count the number of periods of the local clock signals Clock_a-c within one period $T_{LF}$ of the common clock signal Clock_LF. The counter block 40 starts its operation at the first rising edge of the local clock signals Clock_a-c within the considered period $T_{LF}$ of the common clock signal Clock_LF, which also corresponds to the instant when the TDC_stop signal rises at "1" after conversion of the initial fractional period of the local clock signal. The counter block 40 ends its operation after the last rising edge of the local clock signals Clock_a-c within the considered period $T_{LF}$ of the common clock signal Clock_LF, which corresponds to the instant when the TDC_stop signal rises at "1" after the conversion of the last fractional period of the local clock signal.

In a practical implementation, the control logic 12a-12c generates (consequently, detects), within each period $T_{LF}$, a first TDC_start at "1," then a subsequent TDC_stop at "1." This second TDC_stop at "1" triggers the counter block 40 to start its counting operation. Then, a further sequence of TDC_start at "1," and subsequent TDC_stop at "1" is generated (and detected) by the control logic 12a-12c, to measure one period of the local clock signal in TDC units. Then, a further and last sequence of TDC_start at "1," and subsequent TDC_stop at "1" is generated (and detected) by the control logic 12a-12c; this third TDC_stop at "1" triggers the counter block 40 to end its counting operation.

Once that the counter block 40 ends its counting operation, the number of counted periods of the local clock signal can be multiplied by the TDC units of the measured period, and summed to the first and last fractional portions, to have the length of the local clock signal in TDC units and, consequently, the length of the period $T_{LF}$ of the common clock signal Clock_LF, in TDC units.

The following is a numerical example of the above method for calculating $T_{LF\_a}$.

$T_{LF}$=1 µs b=25 ns

Time Resolution of the TDC 16a=100 ps $$A = 100\,TDC \text{ units}$$

$$B = 2000\,TDC \text{ units}$$

-continued $$b = 25 \text{ ns}/100 \text{ ps} = 250 \text{ TDC units}$$

$$d = 50 \text{ TDC units}$$

$$T_{LF\_a} = A + B + C = 100 + 2000 + (250 - 50) = 2300 \text{ TDC units}$$

Alternatively to the above, the conversion in TDC units of the local clock signal Clock_a can be achieved by starting the operation of the TDC 16a at one rising edge of the common clock signal Clock_LF (identifying the beginning of one period $T_{LF}$) and ending the operation of the TDC 16a at the subsequent rising edge of the common clock signal Clock_LF (identifying the end of such period $T_{LF}$). However, when implementing this solution, one should consider the energy consumption of the TDC 16a, which may be consistent and not adequate to portable systems where energy saving is an important requirement.

To summarize, according to step 100 of FIG. 4 (better disclosed based on FIGS. 5-8), each die 10a-10c has been converted in TDC digital units using a respective Time to Digital Converter 16a-16c. Each die 10a-10c stores, in its own memory (not shown), the digital information related to the time length, in TDC digital units, of one period $T_{LF}$ of the common clock signal Clock_LF.

The timing of generation of the control signals Ctrl_a-Ctrl_c depends on the specific application. With reference to the application of FIG. 2, in one period $T_{LF}$ of the common clock signal Clock_LF, all of the three control signals Ctrl_a-Ctlr_c must be generated, for example, spaced apart from one another by $(1/3) \cdot T_{L1}$. As said, the only time reference of each die 10a-10c is the clock signal generated by the local oscillator 12a-12c. The rising/falling edges of the local clock signals Clock_a-Clock_c may not be precisely aligned to the time instant at which the respective control signal Ctrl_a-Ctrl_c must be generated. Therefore, the present invention (step 102 of FIG. 4) provides for the splitting of each local clock signal Clock_a-Clock_c into a plurality of signal fractions, or sub-portions, thus forming a new local clock signal having a resolution higher than the respective local clock signal Clock_a-Clock_c from which it derives.

Figure 9:
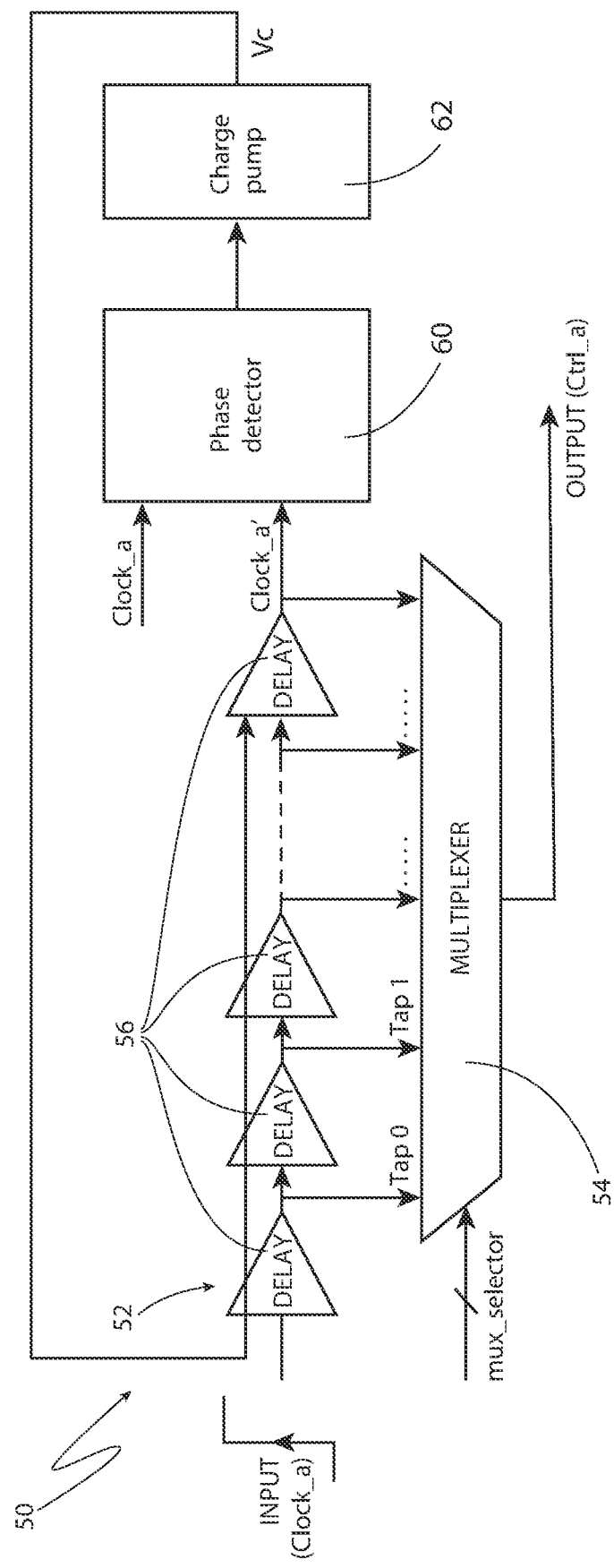
FIG. 9 is a schematic representation of a programmable delay unit according to an embodiment of the invention.

Step 102 of FIG. 4 is implemented using a programmable delay unit (PDU) 50, also known as a programmable delay circuit, as schematically shown in FIG. 9. The PDU produces an output signal following an input signal with a delay selected by input delay selection data.

The PDU 50 is formed by a delay line 52 and a multiplexer 54. The delay line 52 includes a set of delay stages 56 connected in series for successively delaying an input signal, forming a chain. The delay line 52 is a DLL (Delay Locked Loop) or a DDL (Digital Delay Line).

Each delay stage 56 may, for example, be a logic gate that passes an input signal to its output with a delay that depends on the response characteristics of the logic gate 56. With the output of each delay stage 56 constituting a separate "tap" of the delay line, the input signal appears at each tap in succession as the signal pulse traverses the delay line 52. The delay line taps are connected to separate inputs of the multiplexer 54, producing the delay circuit output. The PDU 50 is programmed to provide a desired delay by supplying input control data to the multiplexer 54 so that it passes a selected one of its input delay line taps to its output. The delay of the PDU 50 is the sum of delays of all delay line elements through which the input pulse passes en route to the selected tap, along with the time required for the input pulse to travel through the multiplexer itself. A "linear" PDU provides a delay that is a selected multiple of a desired unit delay. If all elements 56 of the delay line 52 had the same unit delay, then the total delay provided by the PDU 50 would be a linear function of the number of delay elements 56 the input signal passes through the route to the selected tap.

A phase detector 60 detects the phase delay between the local clock signal Clock_a and the delayed local clock signal Clock_a' and provides an impulse signal proportional to the phase difference detected. In particular, it may provide a first output signal "1" if the local clock signal Clock_a is in advance with respect to the delayed local clock signal Clock_a' and a second output signal "0" in the opposite case.

The phase detector 60 measures the phase error between the local clock signal Clock_a, used as a reference, and the delayed local clock signal Clock_a' provided by the delay line 52.

A charge pump 62 may also be provided that allows conversion of the phase difference detected by the phase detector block 62 into a current difference, which, integrated on a capacity, generates a control signal Vc that feedback controls the delay stages 56 of the delay line 52. The multiplexer 54 may be driven by a select signal mux_selector to select one among the output signals of the delay stages 56. In other words, irrespective of the length (number of elements 56) of the delay line 52, the multiplexer 54 can provides at output a signal having an "intermediate" delay corresponding to the chosen output signal of the delay stages 56. Each signal at the output of the delay stages 56 of the delay line 52 is delayed with respect to the respective input signal by a fraction of the period of the received local clock signal Clock_a; such fraction is 1/M, where M is the total number of the delay stages in the delay line 52. For example, M is a power of 2, for example, M=128.

As a consequence, by selecting through the signal mux_selection the m-th delay stage 56 of the delay line 52, an output signal Ctrl_a of the multiplexer 54 is generated, which is delayed with respect to the local clock signal Clock_a received at the input of a quantity m/M of the period of the local clock signal Clock_a.

U.S. Pat. No. 8,183,904 describes an exemplary embodiment of a PDU with a double multiplexer. By introducing a second multiplexer, two output signals with different delays can be achieved. Advantageously, a second input delay selection data is introduced.

The signal mux_selection is provided to the multiplexers 54 of each die 10a-10c by the control logic 14a-14c.

To generate the control signal Ctrl_a delayed by a with respect to the rising edge of the common clock signal Clock_LF, mux_selection is a function of a, and in particular mux_selection is the number of delay stages 56 after which the delay α is obtained (the signal mux_selection is provided, by control logic 14a, to the multiplexer 54 of die 10a).

To generate the control signal Ctrl_b delayed by α+⅓ with respect to the rising edge of the common clock signal Clock_LF, mux_selection is a function of α+⅓ and in particular mux_selection is the number of delay stages 56 after which the delay α+⅓ is obtained (the signal mux_selection is provided, by control logic 14b, to the multiplexer 54 of die 10b).

To generate the control signal Ctrl_c delayed by α+⅔ with respect to the rising edge of the common clock signal Clock_LF, mux_selection is a function of α+⅔ and in particular mux_selection is the number of delay stages 56 after which the delay α+⅔ is obtained (the signal mux_selection is provided, by the control logic 14c, to the multiplexer 54 of die 10c).

Figure 10:
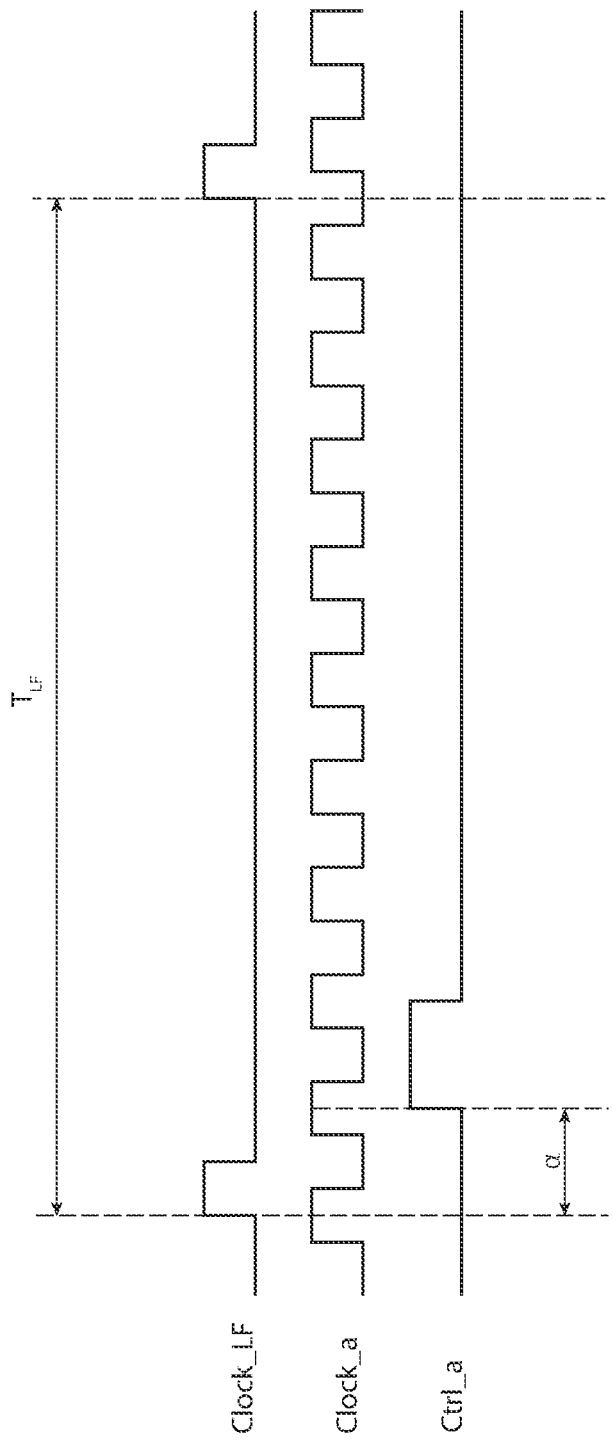
FIG. 10 shows a control signal generated with a delay with respect to the common clock and unrelated to rising or falling edges of the local clock signal, according to an embodiment of the invention.
Figure 11:
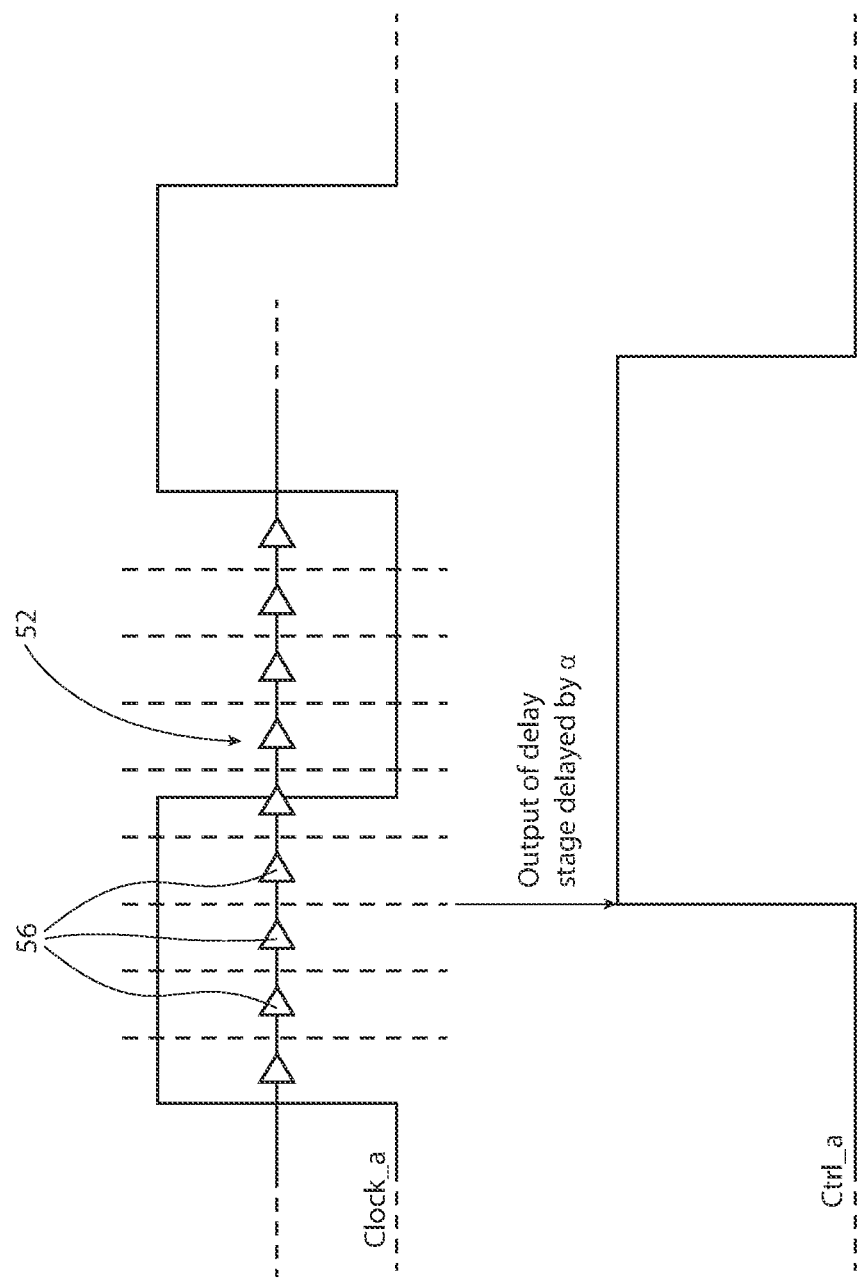
FIG. 11 shows graphically the operation of the delay unit of FIG. 9.

FIGS. 10 and 11 are respective graphical representations showing the operation of the PDU 50. FIG. 10 shows the same signal representations already shown in FIGS. 5 and 6 (limited to the local clock signal Clock_a); FIG. 11 is an enlarged portion of local clock signal Clock_a and control signal Ctrl_a of FIG. 10.

In FIG. 11, a portion of the local clock signal Clock_a is divided, as anticipated, into a plurality of sub-portions; therefore, Figure ii graphically illustrates the operation of the delay stages 56 of the delay line 52 in the generation of the control signal Ctrl_a. As it can be appreciated from FIGS. 10 and 11, the rising edge of control signal Ctrl_a is unrelated to the rising edge of the local clock signal Clock_a, and corresponds to one output among the plurality of outputs of the delay stages 56. The chosen output is selected by the multiplexer 54, as said above, using the signal mux_selection, to guarantee the required delay α, or α+⅓, or α+⅔.

To summarize, the PDUs 50 in the dies 10a-10c are configured to generate signal fractions (or signal sub-portions) of the local clock signals Clock_a, Clock_b, Clock_c, thus increasing the resolution of the local clock signals Clock_a, Clock_b, Clock_c. It is therefore possible to precisely select, in each die 10a-10c, the required delay for the generation of the respective control signals Ctrl_a, Ctrl_b, Ctrl_c based on the respective local clock signals Clock_a, Clock_b, Clock_c only. The higher the number of delay stages 56, the higher the resolution achieved and the temporal precision for generating the control signals Ctrl_a, Ctrl_b, Ctrl_c.

Steps 100-104 of FIG. 4 are repeated, in each die 10a-10c, for each period $T_{LF}$ of the common clock signal Clock_LF.

A numerical example of the functioning of the PDU 50 is provided hereunder to improve understanding of the invention.

The following assumptions are made:

$$\alpha = (1/10) \cdot T_{LF}$$

$T_{LF}$ is the output from the TDC 16a-16c expressed in TDC digital units, for example $T_{LF}$=2300 TDC units (i.e., the value of $T_{LF}$ outputted by the TDC is a number).

Therefore, α=230 TDC units.

The duration, in TDC units, of each sub-portion in which the period of the local clock signal is subdivided by the PDU 50 can be calculated as:

$$(\text{period of Clock\_a})/M$$

If M=128, and (period of Clock_a)=b=250 TDC units, then:

$$b/128 = 250/128 = 1{,}953\ TDC\ \text{units}$$

The duration, in TDC units, of each sub-portion in which the period of the local clock signal is subdivided by the PDU 50 is, therefore, 1,953 TDC units.

The request from the control logic 12a is to raise the control signal Ctrl_a after a time "a," which can be expressed by a fraction of $T_{LF}$, for example, ⅒ of $T_{LF}$, as already said. The control logic 12a generates the signal mux_selection to have the rising edge of Ctrl_a after the correct number of delay stages 56:

$$\text{mux\_selection} = \alpha/1{,}953 = 230/1{,}953 \approx 118\ \text{delay stages}$$

That means that the multiplexer 54 generates the rising edge of Ctrl_a when it receives that output of the 118th delay stage 56.

To calculate the falling edge of the control signal Ctrl_a, the following example is provided.

The request from the control logic 12a is that the falling edge of Ctrl_a must be at a time $\alpha + T_{ON\_a}$, that can be expressed by a fraction of $T_{LF}$, for example $T_{ON}$ α=2/10 Of $T_{LF}$.

The control logic 12a computes the signal mux_selection to have the correct falling edge of Ctrl_a as:

$$\alpha + T_{ON\_a} = 2/10 \cdot T_{LF} = 2/10 \cdot 2300 = 460\ TDC\ \text{units}$$

The falling edge is thus at:

$$460/1{,}953 \approx 235\ \text{delay stages}$$

When, as in this case, the value of mux_selection is higher than M−1 (in this example, M−1=127), the control logic is configured to add the corresponding amount of cycles phase shift of Clock_a. Therefore, since in this example 235>127, one entire cycle of local clock signal Clock_a is added to the phase shift, and the signal mux_selection controlling the falling edge of Ctrl_a becomes:

$$235 - 128 = 107\ \text{delay stages}$$

The number of 107 delay stages is to be counted from the beginning of the subsequent period of Clock_a.

It is stressed that the method described previously is repeated for each period of clock $T_{LF}$; and the method described for control signal Ctrl_a is applied for all the other control signals (Ctrl_b, Ctrl_c, and other control signals if more than three dies 10a-10c are present).

Various embodiments and variants have been described. Those skilled in the art will understand that certain features of these embodiments can be combined and other variants will readily occur to those skilled in the art.

Figure 12:
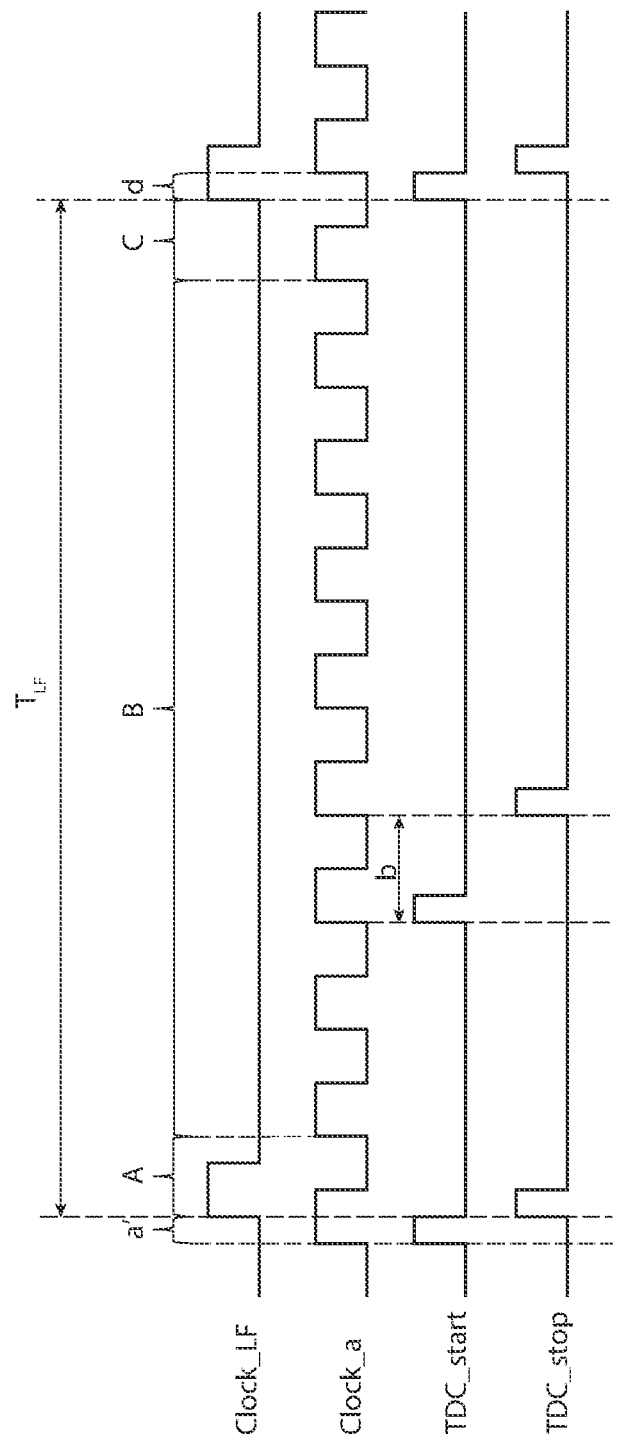
FIG. 12 shows the operative signals of a time-to-digital converter, which converts in digital units a local clock signal during a full period of the common clock signal, according to a further embodiment of the invention.

For example, FIG. 12 shows a possible alternative to the embodiment of FIG. 8. Instead of converting, with the TDC, the signal portion A, in the embodiment of FIG. 12 it is envisaged to convert, with the TDC, the signal portion a' immediately preceding the signal portion A. Signal portion a' corresponds to the portion of the local clock signal (e.g., Clock_a) between the last rising edge of the local clock signal before the beginning of a new period $T_{LF}$ and the subsequent rising edge of common signal Clock_LF, identifying the beginning of the new period $T_{LF}$. In this case, A=b−a'.

Further variants to the above disclosure can be considered.

For example, the resolution of the TDC can be different among different dies 10a-10c; the only request for this parameter is be lower than the period of the local clock signal, for example at least one order of magnitude lower (es., if the local clock signal oscillates with a frequency of the order of nanoseconds—es., 25 ns—then the resolution of the TDC is of the order of picoseconds—es., 100 ps).

The advantages achieved by the invention are evident from the above disclosure.

In several applications, the chip-level digital signals synchronization problem that aims to establish a global clock signal across multiple functional dice is harder to achieve than its single-die counterpart. One example of this problem is the synchronization of all the DPWM signals in a multi-die multi-phase DC/DC converter. The proposed idea implements a process-resilient solution for the above problem by incorporating a programmable digital delay based on Delay-Locked Loops (DLLs) and a Time-to-Digital Converter (TDC). The basic concept is to insert a DLL and a TDC in each clock domain that dynamically tunes and equalizes all the digital outputs thanks to a dedicated digital circuit elaborating all the information. In the multi-die multi-phase DC/DC converter example, the signals to be synchronized are all the DPWM signals generated in different dice (with different clock domains).

The invention disclosed has a further benefit in that the clock network of each die can be designed independently. In contrast, the clock skew of the entire chip can still be minimized at run-time in response to its operating environment.

The solution is moreover fully digital, allowing its integration in low-power devices.

The solution has moreover a very small impact on silicon area and a low power approach.

The proposed solution provides for an approach to use the high precision time to digital convert in a low power mode, with the benefit that the clock network of each die can be designed independently, while the clock skew of the entire chip can still be minimized at run-time, in response to its operating environment also in low power system.

The proposed method achieves the synchronization of multiple control signal with a time resolutions in the order of 100 ps, avoiding the usage of very high frequency oscillator running around 10 GHz.

What is claimed is:

1. A system for generating a plurality of control signals, the plurality of control signals having a respective plurality of dies, each die configured to generate a control signal of the plurality of control signals, each die comprising:
    a local control logic;
    a local clock generator configured to generate a local clock signal;
    a local time-to-digital converter operatively coupled to the local control logic;
    a multiplexer operatively coupled to the local control logic; and
    a local delay unit comprising a chain of delay stages, the chain of delay stages having an input coupled to the local clock generator, each delay stage having a respective output coupled to a respective input of the multiplexer,
    wherein the system further comprises a common clock generator configured to generate a common clock signal with a first period longer than a respective period of each local clock signal,
    wherein, in each die and during the first period, each local control logic is configured to operate the local time-to-digital converter to generate a digital representation of the first period,
    wherein, in each die and during the first period, the chain of delay stages has an input port coupled to the local clock generator to receive the respective local clock signal, the chain of delay stages is further configured to generate, at its respective output, a respective delayed local clock signal for the multiplexer,
    wherein, in each die and during the first period, the respective multiplexer is operable by the local control logic to generate a respective control signal synchronized with the respective delayed local clock signal, the delayed control signal selected in each chain of delay stages such that each control signal is generated during the first period at a time instant that is a fraction of the digital representation of the first period.

2. The system of claim 1, wherein, in each die, the local time-to-digital converter is operatively coupled to the local clock generator to receive the local clock signal,
    wherein, to generate the digital representation of the first period, the local control logic of each die is configured to convert in digital units, in conjunction with the local time-to-digital converter, a portion of the local clock signal, the portion having a time duration corresponding to an entire time duration of the first period.

3. The system of claim 2, wherein, to convert in digital units the portion of the local clock signal, the local control logic is configured to operate the local time-to-digital converter to:
    generate a first digital value by converting in digital units one period of the portion of the local clock signal;
    generate a second digital value by converting in digital units a first sub-portion of the portion of the local clock signal comprised between the beginnings of the first period and an immediately subsequent period of the portion of the local clock signal; and
    generate a third digital value by converting in digital units a second sub-portion of the portion of the local clock signal comprised between an ending of the first period and a beginning of an immediately subsequent period of the local clock signal immediately after the portion of the local clock signal.

4. The system of claim 3, wherein the beginning of the first period corresponds to a first rising edge of the common clock signal, wherein the beginning of the immediately subsequent period of the portion of the local clock signal corresponds to a first rising edge of the portion of the local clock signal, wherein the ending of the first period corresponds to a second rising edge of the common clock signal, and wherein the beginning of the immediately subsequent period of the local clock signal immediately after the portion of the local clock signal corresponds to a rising edge of the local clock signal immediately after the portion of the local clock signal.

5. The system of claim 3, wherein each control logic comprises a digital counter configured to count a total number of full periods of the portion of the respective local clock signal, wherein each local control logic comprises an adder configured to:
    receive the first digital value, the second digital value, the third digital value, and the number of full periods; and
    generate the digital representation of the common clock signal according to the equation: $A+(b \cdot p)+(b-d)$, where b is the first digital value, A is the second digital value, d is the third digital value, and p is the number of full periods of the portion of the local clock signal.

6. The system of claim 1, wherein each time instant of a generation of the respective control signal is spaced apart from another adjacent time instant of a generation of the control signal of a same quantity.

7. The system of claim 1, wherein the digital representation of the first period is a number correlated to the time duration of the first period, or wherein the digital representation of the first period is a number representing the time duration of the first period.

8. A method for generating a plurality of control signals, the method comprising:
providing a common clock signal to a plurality of dies;
generating, in each die, a local clock signal having a period shorter than a first period of the common clock signal;
generating, by a local time-to-digital converter, a digital representation of the first period;
generating, during the first period, a respective delayed local clock signal at an output of each delay stage of a chain of delay stages by providing the local clock signal to the chain of delay stages;
providing the delayed local clock signal to respective input ports of a multiplexer;
selecting, by the multiplexer, a delayed control signal to be provided at an output port of the multiplexer; and
generating, at the output port of the multiplexer, a control signal synchronized with the selected delayed local clock signal, wherein each control signal generated in a respective die is generated during the first period at a time instant that is a fraction of the digital representation of the first period.

9. The method of claim 8, wherein the digital representation of the first period is generated by processing the local clock signal with the local time-to-digital converter.

10. The method of claim 9, wherein generating the digital representation of the first period comprises converting, by the local time-to-digital converter, the local clock signal in digital units.

11. The method of claim 10, wherein converting in digital units the local clock signal comprises:
generating, by the local time-to-digital converter, a first digital value by converting in digital units one period of the portion of the local clock signal;
generating, by the local time-to-digital converter, a second digital value by converting in digital units a first sub-portion of the portion of the local clock signal comprised between the beginnings of the first period and an immediately subsequent period of the portion of the local clock signal; and
generating, by the local time-to-digital converter, a third digital value by converting in digital units a second sub-portion of the portion of the local clock signal comprised between an ending of the first period and a beginning of an immediately subsequent period of the local clock signal immediately after the portion of the local clock signal.

12. The method of claim 11, wherein the beginning of the first period corresponds to a first rising edge of the common clock signal, wherein the beginning of the immediately subsequent period of the portion of the local clock signal corresponds to a first rising edge of the portion of the local clock signal, wherein the ending of the first period corresponds to a second rising edge of the common clock signal, and wherein the beginning of the immediately subsequent period of the local clock signal immediately after the portion of the local clock signal corresponds to a rising edge of the local clock signal immediately after the portion of the local clock signal.

13. The method of claim 11, further comprising:
counting a total number of full periods of the portion of the local clock signal;
receiving the first digital value, the second digital value, the third digital value, and the number of full periods; and
Generating the digital representation of the common clock signal according to the equation cap a. plus open paren b. p close paren plus open paren b minus d close paren, where b is the first digital value, A is the second digital value, d is the third digital value, and p is the number of full periods of the portion of the local clock signal.

14. The method of claim 8, wherein each time instant of a generation of the respective control signal is spaced apart from another adjacent time instant of a generation of the control signal of a same quantity.

15. The method of claim 8, wherein the digital representation of the first period is a number correlated to the time duration of the first period, or wherein the digital representation of the first period is a number representing the time duration of the first period.

16. A die configured to generate a control signal, the die coupled to a common clock generator configured to generate a common clock signal with a first period longer than a respective period of each local clock signal, the die comprising:
a local control logic;
a local clock generator configured to generate a local clock signal;
a local time-to-digital converter operatively coupled to the local control logic;
a multiplexer operatively coupled to the local control logic; and
a local delay unit comprising a chain of delay stages, the chain of delay stages having an input coupled to the local clock generator, each delay stage having a respective output coupled to a respective input of the multiplexer,
wherein, during the first period, the local control logic is configured to operate the local time-to-digital converter to generate a digital representation of the first period,
wherein, during the first period, the chain of delay stages has an input port coupled to the local clock generator to receive the local clock signal, the chain of delay stages is configured to generate, at its respective output, a delayed local clock signal for the multiplexer,
wherein, during the first period, the multiplexer is operable by the local control logic to generate the control signal synchronized with the delayed local clock signal, the delayed control signal selected in each chain of delay stages such that the control signal is generated during the first period at a time instant that is a fraction of the digital representation of the first period.

17. The die of claim 16, wherein the local time-to-digital converter is operatively coupled to the local clock generator to receive the local clock signal, and wherein, to generate the digital representation of the first period, the local control logic is configured to convert in digital units, in conjunction with the local time-to-digital converter, a portion of the local clock signal, the portion having a time duration corresponding to an entire time duration of the first period.

18. The die of claim 17, wherein, to convert in digital units the portion of the local clock signal, the local control logic is configured to operate the local time-to-digital converter to:
generate a first digital value by converting in digital units one period of the portion of the local clock signal;

generate a second digital value by converting in digital units a first sub-portion of the portion of the local clock signal comprised between the beginnings of the first period and an immediately subsequent period of the portion of the local clock signal; and generate a third digital value by converting in digital units a second sub-portion of the portion of the local clock signal comprised between an ending of the first period and a beginning of an immediately subsequent period of the local clock signal immediately after the portion of the local clock signal.

19. The die of claim 18, wherein the beginning of the first period corresponds to a first rising edge of the common clock signal, wherein the beginning of the immediately subsequent period of the portion of the local clock signal corresponds to a first rising edge of the portion of the local clock signal, wherein the ending of the first period corresponds to a second rising edge of the common clock signal, and wherein the beginning of the immediately subsequent period of the local clock signal immediately after the portion of the local clock signal corresponds to a rising edge of the local clock signal immediately after the portion of the local clock signal.

20. The die of claim 18, wherein the local control logic comprises a digital counter configured to count a total number of full periods of the portion of the respective local clock signal, wherein the local control logic comprises an adder configured to:

receive the first digital value, the second digital value, the third digital value, and the number of full periods; and generate the digital representation of the common clock signal according to the equation: $A+(b \cdot p)+(b-d)$, where b is the first digital value, A is the second digital value, d is the third digital value, and p is the number of full periods of the portion of the respective local clock signal.

* * * * *